United States Patent [19]
Vo et al.

[11] Patent Number: 6,157,939
[45] Date of Patent: Dec. 5, 2000

[54] METHODS AND APPARATUS FOR GENERATING MULTIPLICATIVE INVERSE PRODUCT

[75] Inventors: Chuong Van Vo, Milpitas; Moon-Yee Wang, Fremont, both of Calif.

[73] Assignee: Integrated Device Technology, Inc., Santa Clara, Calif.

[21] Appl. No.: 09/090,798

[22] Filed: Jun. 4, 1998

[51] Int. Cl.[7] .................................................. G06F 7/52
[52] U.S. Cl. .............................................................. 708/628
[58] Field of Search .................................... 708/501, 603, 708/628, 629, 630, 631, 620, 615, 627

[56] References Cited

U.S. PATENT DOCUMENTS

| | | | |
|---|---|---|---|
| 4,238,833 | 12/1980 | Ghest et al. | 364/760 |
| 4,755,962 | 7/1988 | Mor | 364/760 |
| 4,813,008 | 3/1989 | Shigehara et al. | 708/630 |
| 5,195,051 | 3/1993 | Palaniswami | 364/748 |
| 5,303,178 | 4/1994 | Ozaki | 708/632 |
| 5,473,559 | 12/1995 | Makino | 364/758 |
| 5,751,618 | 5/1998 | Abiko et al. | 708/490 |

OTHER PUBLICATIONS

Cavanagh, J., "Fixed–Point Multiplication", Digital Computer Arithmetic, (1984) pp. 137–235.

Stearns, C., "Real Time Multiplication and Division for VLSI DSP", Maple Press, (1988), pp. 919–923.

*Primary Examiner*—Chuong Dinh Ngo
*Attorney, Agent, or Firm*—Bever, Hoffman & Harms

[57] ABSTRACT

An multiplier circuit that generates a negate product $-B*C$ quickly without requiring a separate negate operation. This multiplier circuit uses partial product multiplication and any of a variety of multiplication techniques, such as bit-pair recoding or the Booth algorithm, to perform multiplication and negate multiplication operations. The multiplier circuit uses an encoder circuit to produce encoded multiplier strings in accordance with such multiplication techniques. The multiplier circuit reorders bits of such encoded multiplier strings to cause a binary multiplier circuit to generate the negate product $-B*C$ rather than the product $B*C$. The reordering can be accomplished in any manner, such as by a bus coupling the encoder circuit to the binary multiplier circuit. The encoder circuit can be coupled to the binary multiplier circuit using two buses and a multiplexor circuit. One bus might reorder the bits of the encoded multiplier strings to cause the binary multiplier circuit to produce the negate product $-B*C$ and the other bus might pass the encoded multiplier strings to the binary multiplier circuit without reordering its bits so that the binary multiplier circuit produces the product $B*C$. The multiplexor may be used to select one of these two buses depending upon which product is desired. This multiplier circuit might be used in a circuit that performs a multiply/add calculation to produce the result $A+B*C$ and that performs a multiply/subtract calculation to produce the result $A-B*C$.

16 Claims, 5 Drawing Sheets

MULTIPLICAND B    0 1 1 0   0 1 0 1

MULTIPLIER C

| MULTIPLIER STRING | ENCODED MULTIPLIER STRING | BIT PAIR MULTIPLIER | NEGATE BIT PAIR MULTIPLIER |
|---|---|---|---|
| $304_1 = 0\ 1\ 0$ | 304A → 0 0 0 1 0 | 1 | −1 |
| $304_2 = 1\ 0\ 0$ | 304B → 1 0 0 0 0 | −2 | 2 |
| $304_3 = 1\ 1\ 1$ | 304C → 0 0 0 0 1 | 0 | 0 |
| $304_4 = 0\ 1\ 1$ | 304D → 0 1 0 0 0 | 2 | −2 |
|  | 304 | 306 |  |

PARTIAL PRODUCT 1 = (+1 ∗ B) = 0 0 0 0 0 0 0 0 1 1 0 0 1 0 1

PARTIAL PRODUCT 2 = (−2 ∗ B) = 1 1 1 1 1 0 0 1 1 0 1 1 0 0 0

PARTIAL PRODUCT 3 = (0 ∗ B) = 0 0 0 0 0 0 0 0 0 0 0 0 0 0 0

PARTIAL PRODUCT 4 = (+2 ∗ B) = 0 1 1 0 0 1 0 1 0 0 0 0 0 0 0

B ∗ C = 0 1 0 1 1 1 1 1 0 1 1 1 1 0 1

| MULTIPLIER STRING | ENCODED MULTIPLIER STRING | REORDERED MULTIPLIER STRING | NEGATE BIT PAIR MULTIPLIER |
|---|---|---|---|
| $304_1$ = 0 1 0 | 304A<br>00010 | 304A'<br>00100 | -1 |
| $304_2$ = 1 0 0 | 304B<br>10000 | 01000 | 2 |
| $304_3$ = 1 1 1 | 304C<br>00001 | 00001 | 0 |
| $304_4$ = 0 1 1 | 304D<br>01000 | 10000 | -2 |

306

NEGATE PARTIAL PRODUCT 1 = (-1 ∗ B)

NEGATE PARTIAL PRODUCT 2 = (2 ∗ B)

NEGATE PARTIAL PRODUCT 3 = (0 ∗ B)

NEGATE PARTIAL PRODUCT 4 = (-2 ∗ B)
$$\overline{- B * C}$$

FIG. 3B

| MULTIPLIER STRING 402 | ENCODER 202 OUTPUT 404<br>b4 b3 b2 b1 b0 | BIT PAIR MULTIPLIER FOR MULTIPLY/ADD 406 | NEGATE BIT PAIR MULTIPLIER |
|---|---|---|---|
| 0 0 0  or  1 1 1 | 404A<br>00001 | 0 | 0 |
| 0 0 1  or  0 1 0 | 404B<br>00010 | +1 | -1 |
| 1 0 1  or  1 1 0 | 404C<br>00100 | -1 | +1 |
| 0 1 1 | 404D<br>01000 | +2 | -2 |
| 1 0 0 | 404E<br>10000 | -2 | +2 |

FIG. 4

| MULTIPLIER STRING (602) | ENCODER 202 OUTPUT (604) | BIT PAIR MULTIPLIER FOR MULTIPLY/ADD (606) | NEGATE BIT PAIR MULTIPLIER |
|---|---|---|---|
| 0 0 0 0  or  1 1 1 1 | 0 0 0 0 0 0 0 0 1 | 0 | 0 |
| 0 0 0 1  or  0 0 1 0 | 0 0 0 0 0 0 0 1 0 | +1 | −1 |
| 1 1 0 1  or  1 1 1 0 | 0 0 0 0 0 0 1 0 0 | −1 | +1 |
| 0 0 1 1  or  0 1 0 0 | 0 0 0 0 0 1 0 0 0 | +2 | −2 |
| 1 0 1 1  or  1 1 0 0 | 0 0 0 0 1 0 0 0 0 | −2 | +2 |
| 0 1 0 1  or  0 1 1 0 | 0 0 0 1 0 0 0 0 0 | +3 | −3 |
| 1 0 0 1  or  1 0 1 0 | 0 0 1 0 0 0 0 0 0 | −3 | +3 |
| 0 1 1 1 | 0 1 0 0 0 0 0 0 0 | +4 | −4 |
| 1 0 0 0 | 1 0 0 0 0 0 0 0 0 | −4 | +4 |

$r_4 = b_3$
$r_3 = b_4$
$r_2 = b_1$
$r_1 = b_2$
$r_0 = b_0$

METHODS AND APPARATUS FOR GENERATING MULTIPLICATIVE INVERSE PRODUCT

BACKGROUND OF THE INVENTION

1. Field of the Invention

The field of the invention relates generally to methods and apparatus for performing numerical calculations, and more particularly to methods and apparatus for obtaining the multiplicative negate of a product of two numbers.

2. Background

Circuits often implement basic mathematic operations, such as addition, multiplication and negation, to perform numeric calculations. Typically, the greater the number of separate mathematical operations involved in a numeric calculation, the more time a circuit will use to perform the calculation. Accordingly, decreasing the number of separate operations used can improve calculation speed. Such performance improvements can be particularly noticeable in circuits that perform large numbers of calculations, such as digital signal processing functions or matrix multiplication for multimedia applications, for example.

A particular numeric calculation performed by some digital circuits is the multiply/subtract calculation which generates the difference A−(B*C). To perform this calculation, conventional digital circuits may (i) generate the product B*C of two numbers, a multiplicand B and multiplier C, (ii) negate this product to obtain the multiplicative negate product −B*C, and (iii) add this multiplicative negate product to the third number, A. As can be seen, this conventional multiply/subtract calculation uses three separate operations. In particular, it produces the difference A−(B*C) by performing, first, the multiply operation to obtain the product B*C; second, the negate operation to obtain the multiplicative negate −B*C; and, third, the add operation to obtain the difference A−B*C. Because each of these separate operations typically consumes time, reducing the number of such separate operations might improve the speed of methods and apparatus that perform this multiply/subtract calculation.

Another type of calculation performed by digital circuits, the multiply/add calculation, produces the sum A+(B*C). Because this multiply/add calculation does not involve the "subtract" used in the multiply/subtract calculation, it eliminates the separate negate operation used in the multiply/subtract. In particular, a conventional multiply/add circuit may use only two separate operations, the multiply operation and the add operation, to produce the sum A+(B*C).

For cost, space or other reasons, conventional digital circuits may attempt to use common circuitry to perform both the multiply/add and the multiply/subtract calculations. Unfortunately, the different number of operations used by the multiply/add and the multiply/subtract can complicate the use of such common circuitry. For example, common multiply/add and multiply/subtract circuitry may require additional control or other circuitry to account for timing differences and to account for the different operations performed by the multiply/add and multiply/subtract. This additional circuitry may require additional design and testing and may use additional area on the semiconductor die.

Accordingly, there has been a need for a method and apparatus that performs a multiply/subtract calculation using a reduced number of separate operations. Such a multiply/subtract method and apparatus may perform a multiply/subtract more rapidly than conventional multiply/subtract circuits and using no more than the number of separate operations used by a conventional multiply/add circuit. Such a multiply/subtract method and apparatus might reduce the semiconductor area used to implement multiply/subtract circuits or to implement integrated multiply/subtract and multiply/add circuits. Such a multiply/subtract method and apparatus might eliminate additional design and testing associated with integrating such circuits.

SUMMARY OF THE INVENTION

A first embodiment of the present invention obtains a multiplicative negate product (−B*C) of a product of a multiplicand B and a multiplier C. The multiplicand B and the multiplier C can be any number of bits.

This embodiment includes an encoder circuit that has an input for receiving the multiplier C and has an output. The encoder circuit is adapted to identify at least one multiplier string from the multiplier C. Multiplier strings can be identified from the multiplier C in accordance with any of a variety of multiplication techniques such as the Booth algorithm or the bit-pair recoding technique. The multiplier strings will be an appropriate number of bits in accordance with the particular multiplication technique being used. The encoder circuit encodes each multiplier string in accordance with the multiplication technique and provides on the encoder circuit's output an encoded multiplier string that corresponds to the multiplier string from which it was obtained. The particular circuitry in the encoder circuit can be any circuitry that operates in the foregoing manner, including conventional circuitry.

This embodiment also includes a binary multiplier circuit that is coupled to the encoder circuit's output such that the binary multiplier circuit will receive from the encoder circuit the bits of each encoded multiplier string. The binary multiplier circuit has an input for receiving the multiplicand B and may be adapted to receive, or to only receive, encoded multiplier strings such as those output by the encoder circuit. In this embodiment, the binary multiplier circuit performs partial product multiplication using partial product multipliers and/or negate partial product multipliers.

To cause the binary multiplier circuit to use negate partial product multipliers, the bits of the encoded multiplier string are reordered to produce a reordered string. These bits can be reordered by the encoder circuit, by the binary multiplier circuit, by the connection between the encoder circuit and the binary multiplier circuit, by some other circuit, or in any other manner, for example. The binary multiplier circuit determines from the reordered string a negate partial product multiplier that corresponds to the encoded multiplier string. This negate partial product multiplier might be a negate bit-pair multiplier, for example, if bit pair recoding is being used in the embodiment. It might be some other type of multiplier that the binary multiplier circuit uses to generate negate partial products. The binary multiplier circuit generates a negate partial product from each negate partial product multiplier and from the multiplicand B, and sums the generated negate partial products to produce the multiplicative negate product (−B*C). The particular circuitry in the binary multiplier circuit can be any circuitry that operates in the foregoing manner, including conventional circuitry.

In an embodiment of the invention where the connection between the encoder circuit and the binary multiplier circuit reorders the bits of the encoded multiplier string, the connection includes a bus coupled between the encoder circuit and the binary multiplier circuit where the bus reorders bits of the encoded multiplier string. In an alternate embodiment, this connection might include a multiplexor circuit and a first bus coupled in series between the encoder circuit and the binary multiplier circuit wherein the first bus reorders bits of the encoded multiplier string. In another embodiment, the connection might additionally include a second bus coupled in series with the multiplexor circuit between the encoder circuit and the binary multiplier circuit such that the first bus and the second bus are coupled in parallel between the encoder circuit and the binary multiplier circuit. In this embodiment, the second bus may be adapted to pass the bits of the encoded multiplier string between the encoder circuit and the binary multiplier circuit without reordering and the multiplexor may operate to pass the bits of the encoded multiplier string to the binary multiplier circuit using either one of the first or the second bus.

In an embodiment of the invention, the multiplier circuit may include a plurality of multiplexors, the first bus might include a plurality of first bus lines and the second bus might include a plurality of second bus lines. In this embodiment, at least one first bus line from the first bus and at least one second bus line from the second bus might be coupled to each of the plurality of multiplexors and each of the plurality of multiplexors might pass bits of the encoded multiplier string between the encoder circuit and the binary multiplier circuit using one of the at least one first bus line and the at least one second bus line. In an embodiment, each of the plurality of first bus lines might be coupled to one of the plurality of multiplexors such that when the multiplexor circuit uses the first bus to pass the bits of the encoded multiplier string to the binary multiplier circuit, the bits of the encoded multiplier string are reordered by the bus.

The reordering of the bits is accomplished in a manner appropriate based upon the particular type of encoding being used. It is performed such that the binary multiplier circuit will produce a negate partial product multiplier that corresponds to each encoded multiplier string from the multiplier C. This reordering might be accomplished by exchanging bits in the encoded multiplier string, for example. Some bits of the encoded multiplier string may not need to be reordered.

Another embodiment of the invention performs a multiply/add calculation and a multiply/subtract calculation using a number A, a multiplicand B and a multiplier C. This embodiment includes a multiplier circuit having a first input for receiving the multiplicand B, a second input for receiving the multiplier C and an output. In this embodiment, the multiplier circuit is adapted to generate a product B*C using a multiply operation, is adapted to generate a negate product (−B*C) using a negate multiply operation and is adapted to provide to its output a result which is one of the product B*C and the negate product −B*C. Negate multiply operation refers to the technique of using reordered strings to produce a negate product. In this embodiment, a control line may be coupled to the multiplier circuit for receiving a control signal that causes the multiplier circuit to select one of the product B*C and the negate product −B*C to be provided to the output of the multiplier circuit.

This embodiment also includes an adder circuit coupled to the multiplier circuit to receive from the multiplier circuit the result wherein the adder circuit has an input for receiving the number A and the adder circuit is adapted to sum the number A with the result to provide a sum A+B*C when the result is the product B*C and to provide the difference A−B*C when the result is the negate product −B*C. In this embodiment, the multiplier circuit that performs the negate multiply operation may be the first embodiment described above that includes the encoder circuit and the binary multiplier circuit.

Another embodiment of the invention is a method for producing a negate product −B*C from a multiplicand B and a multiplier C. This method includes the steps of identifying from the multiplier C a multiplier string; generating from the multiplier string an encoded multiplier string; reordering bits of the encoded multiplier string to produce a reordered string; generating from the reordered string a negate partial product multiplier; generating from the negate partial product multiplier and the multiplicand B a negate partial product; and generating from the negate partial product the negate product −B*C.

BRIEF DESCRIPTION OF THE DRAWINGS

Embodiments of the present invention are described in the detailed description with reference to the following figures:

FIG. 3B illustrates bit reordering and negate bit pair multipliers used by an embodiment of the present invention;

FIG. 4 illustrates bit pair recoding for three bit multiplier strings in accordance with an embodiment of the present invention;

DETAILED DESCRIPTION

Embodiments of the invention provide a novel method and apparatus for performing numerical calculations. The following description is presented to enable a person skilled in the art to make and use the invention. Descriptions of specific embodiments are provided only as examples. Various modifications to the described embodiments may be apparent to those skilled in the art, and the generic principles defined herein may be applied to other embodiments and applications without departing from the spirit and scope of the invention. Thus, the present invention is not limited to the described or illustrated embodiments, but is to be accorded the widest scope consistent with the principles and features disclosed herein.

Figure 1:
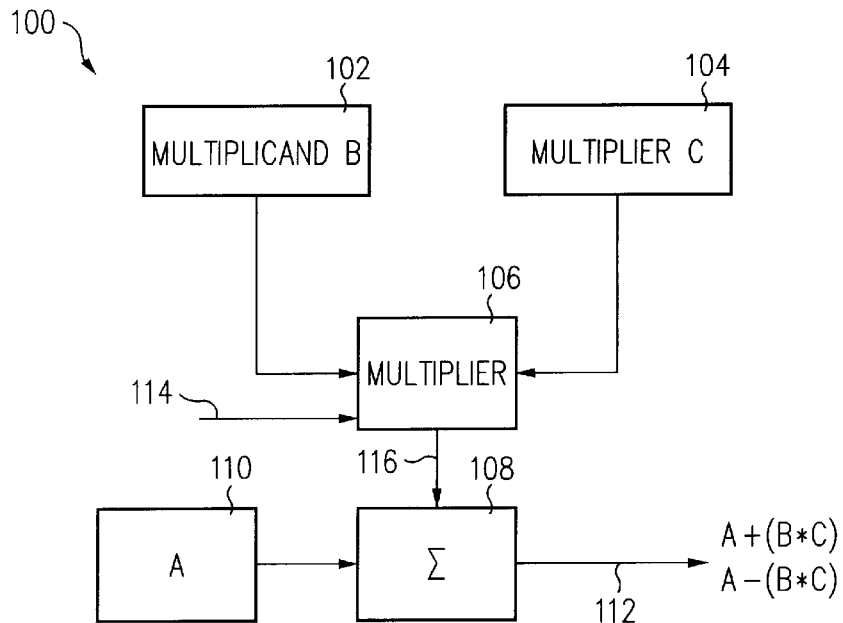
FIG. 1 is a block diagram of a circuit 100 that performs both a multiply/add and a multiply/subtract calculation.

Circuit 100, in FIG. 1. illustrates an embodiment of the present invention. This circuit 100 is able to perform both the multiply/add calculation and the multiply/subtract calculation using the numbers A, B and C. Alternate embodiments of the invention might perform different calculations. For example, alternate embodiments might generate only the result A−B*C or only the result −B*C. The circuit 100 is adapted to generate both of the results A+B*C and A−B*C. These numbers A, B and C might represent data obtained or used in connection with digital signal processing. For example, when estimating the spectrum of a sampled signal, the number A might represent the accumulated sum of time sampled values of the signal, the number B might represent the current time sampled value of the signal, and the number C might represent the twiddle factor. The numbers A, B and C might be used to perform matrix multiplication in a multimedia applications, for example. They might represent interim numbers generated as part of some larger calculations as might be the case if used to filter signals or process graphics. Embodiments of the invention are not limited to the foregoing applications. In the present embodiment, A, B and C are binary numbers. B shall be referred to as the multiplicand and C shall be referred to as the multiplier. Circuit 100 uses the same number of separate operations, two, to perform each of the multiply/add calculation and the multiply/subtract calculation. Alternate embodiments need not use the same number of separate operations for both of these calculations.

As shown in FIG. 1, the circuit 100 includes registers 102, 104 and 110, a multiplier circuit 106, its output 116, adder circuit 108, output 112 and control line 114. The registers 102 and 104 and the control line 114 are coupled to the multiplier circuit 106; the output 116 of the multiplier circuit 106 is coupled to an input of the adder circuit 108; the register 110 is coupled to a second input of the adder circuit 108; and the output of adder 108 provides the output 112. Before circuit 100 begins to calculate a result, register 102 stores the multiplicand B, register 104 stores the multiplier C and register 110 stores the number A. The multiplicand B and the multiplier C are then input to the multiplier circuit 106 from the respective registers 102 and 104. After receiving the multiplicand B and the multiplier C, the multiplier circuit 106 outputs on output 116 a calculated result, which result is either the product B*C or the multiplicative negate of the product B*C; i.e. −B*C. Control line 114 selects whether the multiplier circuit 106 will output the product B*C or the multiplicative negate product −B*C. The result output on output 116 and the number A, stored in register 110, are input into adder circuit 108. After receiving the result from output 116 and the number A from register 10, the adder circuit 108 provides a result to the output 112. This result on output 112 will be either the multiply/add result, A+B*C, or the multiply/subtract result, A−B*C, depending upon whether the product B*C or the multiplicative negate product −B*C was output on output 116.

Figure 2:
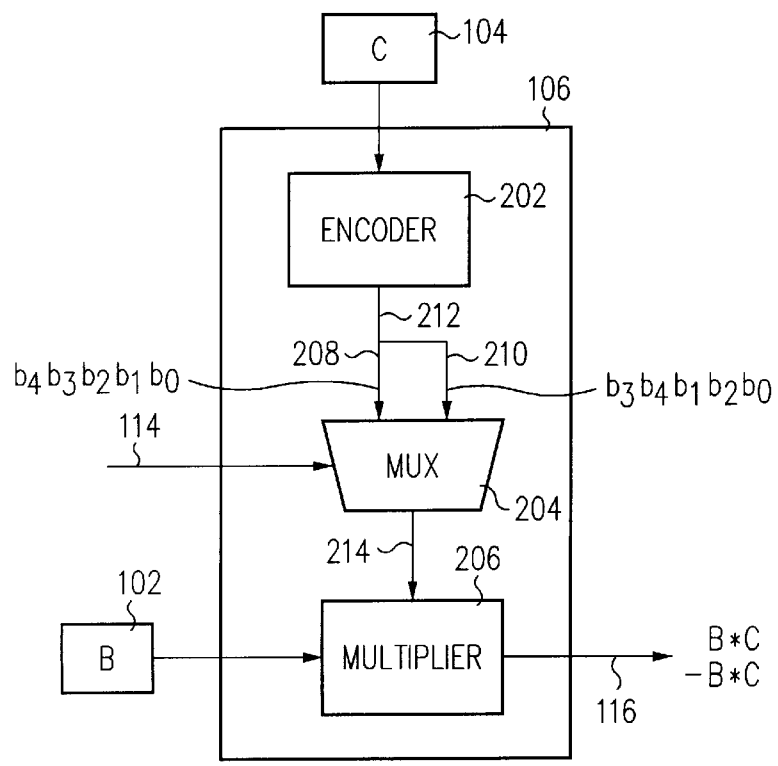
FIG. 2 is an expanded view of multiplier circuit 106 of FIG. 1.

FIG. 2 illustrates an expanded view of the multiplier circuit 106. The manner in which multiplier 106 generates the product B*C and the multiplicative negate product −B*C is described with reference to this figure. As shown in FIG. 2, the multiplier circuit 106 includes encoder 202 having an output 212, multiplexor 204 having an output 214, buses 208 and 210, and binary multiplier circuit 206. The register 104, of FIG. 1, is coupled to an input of encoder 202, and the register 102, of FIG. 1, is coupled to an input of binary multiplier circuit 206. The output 212 of encoder 202 is coupled to binary multiplier circuit 206 through multiplexor 204 using one of buses 208 and 210. The output 214 of multiplexor 204 is coupled to the binary multiplier circuit 206. Control line 114 is coupled to multiplexor 204. The output 116, of FIG. 1, is provided by the output of the binary multiplier circuit 206.

In FIG. 2, encoder 202 is a conventional bit-pair recoding encoder for performing binary multiplications. Bit pair recoding is derived from the Booth Algorithm. Please see Joseph J. F. Cavanagh, *Digital Computer Arithmetic*, Ch. 3, Sections 3.3 and 3.4, McGraw-Hill, Inc., 1984 for discussions of the Booth algorithm and bit pair recoding. Joseph J. F. Cavanagh, *Digital Computer Arithmetic*, McGraw Hill, Inc., 1984 is hereby incorporated herein by this reference. Encoder 202 could use other types of multiplication algorithms or techniques. Encoder 202 outputs on its output 212 encoded multiplier strings that encoder 202 generates from the multiplier C in accordance with conventional bit-pair recoding techniques. Multiplexor 204 couples output 212, and passes the encoded multiplier strings output on output 212, to binary multiplier circuit 206 through either bus 208 or bus 210 depending upon the control signal on control line 114. Bus 208 is used if binary multiplier circuit 206 is to produce the product B*C, and bus 210 is used if binary multiplier circuit 206 is to produce the multiplicative negate −B*C. As will be described, bus 208 passes the bits of the encoded multiplier string to circuit 206 without reordering such bits, whereas bus 210 passes the bits of the encoded multiplier string to circuit 206 reordered. Encoded multiplier string shall refer to the encoded multiplier string without reordered bits and reordered string shall refer to the encoded multiplier string with reordered bits. Binary multiplier circuit 206 produces the product B*C if it receives the encoded multiplier string and produces the multiplicative negate −B*C if it receives the reordered string.

Figure 3A:
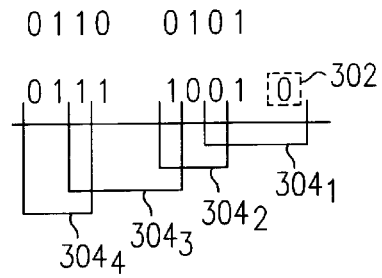
FIG. 3A illustrates a sample multiplicand and multiplier and associated partial products.

An example of the operation of encoder 202 on a particular multiplier C is now described with reference to FIGS. 3A and 4. First referring to FIG. 3A, in this example, the multiplier C is the binary number 01111001. The zero 302 in FIG. 3A is the implied zero used according to conventional bit pair recoding. When the encoder 202 receives the multiplier C, it evaluates the multiplier C, in accordance with conventional bit pair recoding, as a number of multiplier strings $304_1$, $304_2$, $304_3$, and $304_4$. The number of bits in each of these multiplier strings is determined in accordance with conventional bit pair recoding practices. In the example shown in FIG. 3A, each multiplier string $304_1$, $304_2$, $304_3$, and $304_4$ has three bits.

After identifying each multiplier string $304_1$, $304_2$, $304_3$, and $304_4$, encoder 202 encodes each of these multiplier strings in accordance with conventional bit-pair recoding. The encoding of these multiplier strings can be understood with reference to FIG. 4. In particular, column 402 in FIG. 4 shows all possible three bit multiplier strings. Column 404 shows encoded multiplier strings that correspond, according to conventional bit-pair recoding, to the multiplier strings in column 402. In particular, the multiplier string in a row in column 402 corresponds to the encoded multiplier string in the same row in column 404. When encoding multiplier strings, the encoder 202 produces the encoded multiplier string in column 404 from the corresponding multiplier string in column 402. Thus, for example, if encoder 202 determines that the multiplier C contains the multiplier string 010 or 001 (column 402), encoder 202 will output for this multiplier string on output 212 the encoded multiplier string 00010 (column 404). Similarly, if encoder 202 determines that the multiplier C contains the multiplier string 011, encoder 202 will output for this multiplier string on output 212 the encoded multiplier string 01000 (column 404). As shown by columns 402 and 404 of FIG. 4, when encoder 202 identifies in the multiplier C three bit multiplier strings (column 402), encoder 202 outputs five bit encoded strings (column 404). Thus, as shown in FIG. 3A, for that example encoder 202 would output the encoded multiplier string 304A for the multiplier string $304_1$; the encoded multiplier string 304B for the multiplier string $304_2$; the encoded multiplier string 304C for the multiplier string $304_3$; and the encoded multiplier string 304D for the multiplier string $304_4$.

Referring again to FIG. 2, the multiplexor 204 controls whether encoded multiplier strings or reordered strings are passed from the output 212 to the binary multiplier circuit 206. A control signal on control line 114 configures to multiplexor 204 to pass the bits of the encoded multiplier string to binary multiplier circuit 206 using bus 208 or configures the multiplexor 204 to pass the bits of the encoded multiplier string to the binary multiplier circuit 206 using bus 210. Bus 208 does not reorder the bits of the encoded multiplier string. Bus 210 does reorder the bits of the encoded multiplier string. Accordingly, if bus 208 is used, binary multiplier circuit 206 receives the encoded multiplier string. If bus 210 is used, binary multiplier circuit receives the reordered string. Referring again to the example in FIG. 3A, if bus 208 is used, the encoded multiplier strings 304A, 304B, 304C and 304D would be passed to binary multiplier circuit 206. If bus 210 is used, reordered strings would be passed to circuit 206. The manner in which the reordering is performed is discussed below.

In the present embodiment, the binary multiplier circuit 206 is adapted to receive and process any five bit encoded multiplier strings that corresponds to a three bit multiplier string, i.e. any of the encoded multiplier strings shown in column 404 of FIG. 4. No information needs to be provided to binary multiplier circuit 206 to tell whether it is receiving the encoded multiplier string or the reordered string. If the circuit 206 receives the encoded multiplier string, it will generate the product B*C. If the circuit 206 receives reordered string, it will generate the multiplicative negate −B*C. The same circuitry of binary multiplier circuit processes the encoded multiplier string and the reordered string. Accordingly, binary multiplier circuit 206 can be a conventional circuit that processes encoded multiplier strings. The binary multiplier circuit 206 need not be modified to enable it to process reordered strings. As will be described, the reordered string is actually another encoded multiplier string from column 404. Thus, the bits of the original encoded multiplier string are being reordered so that the binary multiplier circuit 206 receives a different encoded multiplier (i.e. the reordered string). The reordered string causes the binary multiplier circuit 206 to perform the multiplication of the multiplicand B with the multiplier C in a manner that generates the multiplicative negate product −B*C.

Binary multiplier circuit 206 uses conventional partial product multiplication with bit-pair recoding to perform multiplication calculations. Circuit 206 could be adapted to use mathematical algorithms other than bit pair recoding. The algorithm used by circuit 206 will correspond to the algorithm used by encoder 202 to produce the encoded multiplier strings. In the present embodiment, when performing a multiplication to generate the product B*C, binary multiplier circuit 206 determines a bit-pair multiplier, in accordance with conventional bit-pair recoding, from each encoded multiplier string that it receives from multiplexor output 214. Binary multiplier circuit 206 uses these bit pair multipliers to generate partial products. Please see Joseph J. F. Cavanagh, *Digital Computer Arithmetic*, McGraw-Hill, Inc., 1984, pp. 159–163 and Table 3.3. FIG. 4 illustrates each of the possible five bit encoded multiplier strings in column 404. These possible encoded multiplier strings have been labeled 404A, 404B, 404C, 404D and 404E. Column 406 shows the bit pair multipliers that correspond, in accordance with conventional bit pair recoding, to the encoded multiplier strings in column 404. In particular, the encoded multiplier string in a row in column 404 corresponds to the bit pair multiplier in the same row in column 406. Thus, for example, if the bit pair multiplier circuit 206 receives the encoded multiplier string 00010 (column 404), circuit 206 would use the bit pair multiplier 1 (column 406) to generate a partial product. Similarly, if the bit pair multiplier circuit 206 receives the encoded multiplier string 00100 (column 404), circuit 206 would use the bit pair multiplier −1 (column 406) to generate a partial product.

The generation of partial products by binary multiplier circuit 206 can be understood with reference to FIGS. 2 and 3A. Binary multiplier circuit 206 receives the multiplicand B from the register 102 as shown in FIG. 2. Binary multiplier circuit 206 generates a partial product for each multiplier string that it identifies in the multiplier C. It does this by multiplying the multiplicand B by each of the bit-pair multipliers determined by binary multiplier circuit 206 in the foregoing manner. In the example shown in FIG. 3A, binary multiplier circuit 206 would determine from the encoded multiplier strings shown in column 304 of that figure the bit pair multipliers shown in column 306. Thus, upon receiving the encoded multiplier string 304A, binary multiplier circuit 206 would use the bit pair multiplier 1 to generate the partial product 1. Upon receiving the encoded multiplier string 304B, binary multiplier circuit 206 would use the bit pair multiplier −2 to generate the partial product 2. Upon receiving the encoded multiplier string 304C. binary multiplier circuit 206 would use the bit-pair multiplier 0 to generate the partial product 3. Upon receiving the encoded multiplier string 304D, binary multiplier circuit 206 would use the bit-pair multiplier 2 to generate the partial product 4.

As shown in FIG. 3A, binary multiplier circuit 206 generates partial products 1 through 4 in accordance with conventional bit-pair recoding partial product multiplication. Circuit 206 multiplies the multiplicand B by the bit pair multipliers 1, −2, 0 and 2, respectively, shifts each resulting product to the left by the number of bit positions appropriate for the particular partial product being generated and treats the empty low bit positions resulting from such shifts as zeroes. For example, in FIG. 3A, the product (−2*B) has been shifted left two bit positions to produce the partial product 2; the product (0*B) has been shifted left four bit positions to produce the partial product 3; and the product (2*B) has been shifted left six bit positions to produce the partial product 4. After generating such partial products, binary multiplier circuit 206 adds together the partial products to produce the product B*C. Referring again to FIGS. 1 and 2, this product B*C is output on output 116 of multiplier 106. In the present embodiment multiplier 106 generates this product B*C in 2, 3 or 5 clock cycles depending on whether the multiplicand B and multiplier C are 16, 32 or 64-bits, respectively. Conventional multiplier circuits can be used as binary multiplier circuit 206.

With reference to FIG. 1, the product B*C and the number A are next input to conventional adder circuit 108. Adder circuit 108 completes the multiply/add calculation by generating and outputting on output 112 in one additional clock cycle the result A+B*C. As the foregoing description illustrates, the multiply/add calculation performed by the circuit 100 uses two separate operations: the multiply operation performed by multiplier circuit 106 and the add operation performed by adder circuit 108.

Figures 6, 7:
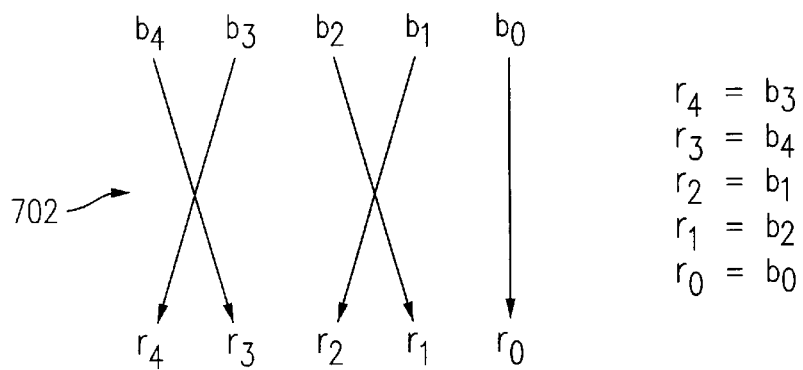
FIG. 6 illustrates bit pair recoding for four bit multiplier strings in accordance with an embodiment of the present invention.
FIG. 7 provides a functional illustration of the reordering of the bits of encoded multiplier strings.

Multiplier circuit 106 generates the multiplicative negate product −B*C by using the bus 210 to provide reordered strings to binary multiplier circuit 206 rather than using bus 208 to provide the encoded multiplier strings to multiplier circuit 206. These reordered strings are processed by binary multiplier circuit 206 in the same manner as were the encoded multiplier strings because, as was discussed, these reordered strings are encoded multiplier strings (e.g. shown in column 404 of FIG. 4). The reordered strings are produced by bus 210 and multiplexor 204 by reordering the bits of each encoded multiplier string such that the bit pair multiplier of the reordered string is the multiplicative negate of the bit pair multiplier of the encoded multiplier string from which the reordered string is produced. The bit pair multipliers of the reordered strings shall be referred to as negate bit pair multipliers. FIG. 7 shows a functional illustration of the reordering 702 accomplished by bus 210. The binary string $b_4b_3b_2b_1b_0$ represents the encoded multiplier string output by the encoder 202, and the binary string $r_4r_3r_2r_1r_0$ represents the reordered string output by multiplexor 204 on output 214 and received by binary multiplier circuit 206. As shown in FIG. 7, $r_0=b_0$, $r_1=b_2$, $r_2=b_1$, $r_3=b_4$, and $r_4=b_3$ in the reordered string. Thus, in the example of FIG. 3A negate partial products are produced as shown in FIG. 3B rather than the partial products of FIG. 3A.

Examining FIG. 4 shows that for each possible bit pair multiplier in column 406, the multiplicative negate of that bit pair multiplier is also a bit pair multiplier in column 406. Thus, for example, multiplier strings 001 and 010 correspond to bit pair multiplier 1, and multiplier strings 101 and 110 correspond to bit pair multiplier −1. The bit pair multiplier −1 is the multiplicative negate of the bit pair multiplier 1. Similarly, multiplier string 011 corresponds to bit pair multiplier 2, and multiplier string 100 corresponds to bit pair multiplier −2. Accordingly, as shown by columns 404 and 406 of FIG. 4 and the foregoing description, binary multiplier circuit 206 is adapted to receive and process an encoded multiplier string for each bit pair multiplier and an encoded multiplier string for the multiplicative negate of each bit pair multiplier. For example, binary multiplier circuit 206 will use the bit pair multiplier 1 to generate a partial product when circuit 206 receives the encoded string 00010 and will use the bit pair multiplier −1 to generate a partial product when circuit 206 receives the encoded string 00100. Thus, if encoder 202 outputs an output 212 the encoded multiplier 00010, bus 210 can reorder the bits of this encoded multiplier string so that binary multiplier circuit 206 receives the reordered string 00100. As can be seen from FIG. 4 columns 404 and 406, the reordered string 00100 will cause the binary multiplier circuit 206 to use the bit pair multiplier −1 to generate a partial product rather than using the bit pair multiplier 1.

Referring again to the example of FIG. 3A, binary multiplier circuit 206 used the bit-pair multiplier 1 to generate a partial product 1 when circuit 206 received the encoded multiplier string 00010 through bus 208 from encoder 202. Referring now to FIG. 3B, the reordering accomplished by bus 210 (as shown by FIG. 7) would cause binary multiplier circuit 206 to receive the reordered string 304A. Columns 404 and 406 of FIG. 4 show that this reordered string will cause the binary multiplier circuit 206 to use the bit pair multiplier (i.e, the negate bit pair multiplier) of −1 to generate a partial product. This partial product is the negate partial product 1 shown in FIG. 3B. Similarly, as shown by FIGS. 3B and 4, the reordering of the encoded multiplier strings 304B, 304C and 304D by bus 210 (as shown by FIG. 7) will cause the binary multiplier circuit 206 to use the negate bit pair multipliers 2, 0 and −2, respectively, to generate the negate partial products 2, 3 and 4, respectively. Because these negate bit pair multipliers have been used to form the negate partial products, these negate partial products of FIG. 3B are the multiplicative negate of the partial products shown in FIG. 3A. Accordingly, adding together these negate partial products produces the result −B*C.

The specific reordering to be used for the bits of the encoded multiplier strings can be determined from further examination of FIG. 4. In particular, column 404 of FIG. 4 reveals that the bit position of the "one" bits in the encoded multiplier strings determines which bit pair multiplier (column 406) circuit 206 will use to generate a partial product. Embodiments of the present invention take advantage of the fact that changing the order of these "one" bits can cause the binary multiplier circuit 206 to use a negate bit pair multiplier for the encoded multiplier string output by the encoder 202. Examining columns 404 and 406 of FIG. 4 shows that reversing bits $b_1$ and $b_2$ of the encoded multiplier strings will cause binary multiplier circuit 206 to receive string 404C when encoder 202 outputs string 404B and will cause circuit 206 to receive string 404B when encoder 202 outputs string 404C. Examination of column 406 reveals that this reordering will cause binary multiplier circuit 206 to use negate bit pair multipliers when encoded multiplier strings 404B and 404C are output by encoder 202. For example, if encoded multiplier string 404B (i.e. 00010) is output by encoder 202, circuit 206 will receive reordered string 404C (i.e. 00100). The binary multiplier circuit 206, receiving the string 404C, will use the negate bit pair multiplier −1 to generate a negate partial product for the string 404B output by encoder 202, rather than using the bit pair multiplier 1 to generate a partial product. This same analysis shows that a similar result is achieved when encoder 202 outputs encoded multiplier string 404C. In particular, when encoder 202 outputs the string 404C, binary multiplier circuit 206 will receive through bus 210 the string 404B. In response to receiving 404B, the binary multiplier circuit 206 will use the negate bit pair multiplier 1 to generate a negate partial product for the string 404C output by encoder 202 rather than using the bit pair multiplier −1 to generate a partial product. Further examination of column 404 of FIG. 4 shows that this reversing of bits $b_1$ and $b_2$ has no effect on the bit-pair multiplier used by circuit 206 when any of the encoded multiplier strings 404A, 404D and 404E are output by encoder 202. This reordering has no effect in these situations because bits $b_1$ and $b_2$ are both zero in each of these strings 404A, 404D and 404E.

This type of analysis also shows that reversing bits $b_3$ and $b_4$ in the encoded multiplier string output by encoder 202 will cause circuit 206 to use the negate bit pair multiplier when encoded multiplier strings 404D and 404E are output by encoder 202 and that reordering bits $b_3$ and $b_4$ will not affect the bit pair multiplier used by circuit 206 when the strings 404A, 404B and 404C are output by encoder 202. Finally, as shown in columns 404 and 406 in FIG. 4, $b_0=1$ causes circuit 206 to use a bit pair multiplier of zero. Because the multiplicative negate of zero is zero, $b_0$ can be passed by bus 210 and multiplexor 204 directly through to binary multiplier circuit 206 without reordering when circuit 206 is calculating negate partial products. Thus, when encoder 202 outputs the encoded multiplier string 00010, which FIG. 4 shows corresponds to bit pair multiplier 1, binary multiplier circuit 206 will receive from bus 210 the reordered string 00100 which will cause circuit 206 to use the negate bit pair multiplier −1 to generate a negate partial product. When encoder 202 outputs the encoded multiplier string 00100, which corresponds to bit pair multiplier −1, binary multiplier circuit 206 will receive from bus 210 the reordered string 00010 which will cause circuit 206 to use the negate bit pair multiplier 1 to generate a negate partial product. When encoder 202 outputs the encoded multiplier string 01000, which FIG. 4 shows corresponds to bit pair multiplier 2, binary multiplier circuit 206 will receive from bus 210 the reordered string 10000 which will cause circuit 206 to use the negate bit pair multiplier −2 to generate a negate partial product.

Similarly, when the encoder 202 outputs the encoded multiplier string 10000, which FIG. 4 shows corresponds to the bit pair multiplier −2, binary multiplier circuit 206 will receive from bus 210 the reordered string 01000 which will cause circuit 206 to use negate bit pair multiplier 2 to generate a negate partial product. In particular, with reference to FIG. 3 as an example, instead of producing the partial product 1 using (1*B), the multiplier circuit 206 would produce the negate partial product 1 using (−1*B). Similarly, instead of producing the partial product 2 using (−2*B) and the partial product 4 using (2*B), the circuit 206 would produce the negate partial product 2 using (2*B) and the negate partial product 4 using (−2*B). The partial product 3 and the negate partial product 3 are both zero because the multiplicative negate of zero is zero. Adding together these negate partial products produces the multiplicative negate product −B*C.

Thus, referring to FIG. 2, binary multiplier circuit 206 can produce the product B*C or the multiplicative negate product −B*C by switching between bus 208 and bus 210 in response to a control signal on control line 114. To produce the product B*C, multiplexor 204 and bus 208 pass each encoded string $b_4b_3b_2b_1b_0$ output by encoder 202 to binary multiplier circuit 206 unchanged as $b_4b_3b_2b_1b_0$. To produce the multiplicative negate −B*C, the multiplexor 204 and bus 210 pass each encoded string $b_4b_3b_2b_1b_0$ to binary multiplier circuit 206 with the bits reordered to produce the reordered string $b_3b_4b_1b_2b_0$.

Referring to FIG. 1, after the multiplicative negate −B*C and the number A are input to conventional adder circuit 108, adder circuit 108 completes the multiply/subtract calculation by generating and outputting on output 112 the result A+(−B*C). As the foregoing description illustrates, the multiply/subtract calculation performed by the circuit 100 requires only two separate operations: the negate multiply operation performed by multiplier circuit 106 and the add operation performed by adder circuit 108. Accordingly, multiplier circuit 106 performs the multiply/add calculation and the multiply/subtract calculation in the same number of operations. In particular, the multiply/add uses two separate operations and the multiply/subtract has been reduced from three separate operations to two. Multiplexor circuit 204 has been added to accomplish the bit reordering used by the present embodiment.

Figure 5:
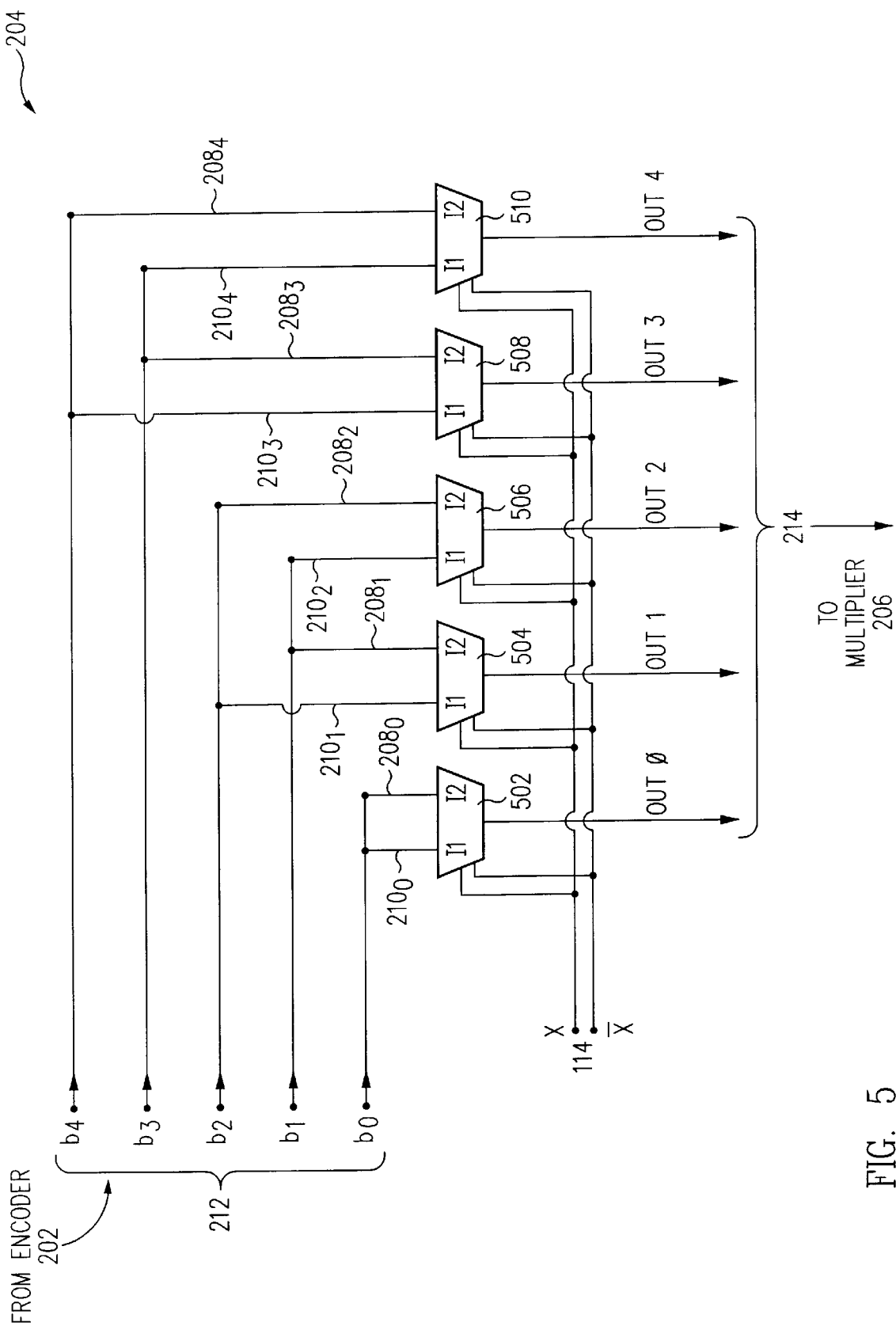
FIG. 5 illustrates an expanded view of multiplexer 204 of FIG. 2.

FIG. 5 shows details of the multiplexor 204 and implementation of buses 208 and 210 of FIG. 2 as used in the binary multiplier circuit 206. Alternate embodiments of the invention need not use this same multiplexor, but could use other multiplexors consistent with the other principles disclosed herein. As shown in FIG. 5, multiplexor 204 uses conventional multiplexors 502, 504, 506, 508 and 510 each having two inputs, I1 and I2. The output 212 of encoder 202 is coupled to the inputs of multiplexors 502, 504, 506, 508 and 510 using buses 208 and 210. Bus 208 includes lines $208_0, 208_1, 208_2, 208_3$ and $208_4$ and bus 210 includes lines $210_0, 210_1, 210_2, 210_3$ and $210_4$. The bit zero ($b_0$) line of output 212 is coupled to both inputs I1 and I2 of multiplexor 502. The bit one ($b_1$) line of output 212 is coupled to the input I2 of multiplexor 504 and to the input I1 of multiplexor 506. The bit two ($b_2$) line of output 212 is coupled to the input I1 of multiplexor 504 and the input I2 of multiplexor 506. The bit three ($b_3$) line of output 212 is coupled to the input I2 of multiplexor 508 and the input I1 of multiplexor 510. The bit four ($b_4$) line of output 212 is coupled to the input I1 of multiplexor 508 and the input I2 of multiplexor 510. The outputs Out 0 through Out 4 of the multiplexors 502, 504, 506, 508 and 510 respectively, provide the output 214 of the multiplexor 204. The control line 114 is coupled to each of the multiplexors 502, 504, 506, 508 and 510. Any appropriate type of control line 114 can be used, such as a single line or complementary lines. FIG. 5 shows a complementary line control line 114 where x and $\bar{x}$ represent the control signal on control line 114.

In operation, the control signal on control line 114 will be in one of two states. For example, the control signal may have a first state where x=1 and $\bar{x}$=0, and a second state where x=0 and $\bar{x}$=1. In the present embodiment, the control signal's first state configures the multiplexors 502, 504, 506, 508 and 510 to pass the bits on the inputs I1 to the respective outputs Out 0 through Out 4 of the multiplexors. The control signal's second state configures the multiplexors 502, 504, 506, 508 and 510 to pass the bits on the inputs I2 to the respective outputs Out 0 through Out 4 of such multiplexors.

Accordingly, as shown in FIG. 5, the second state of the control signal causes the multiplexors 502, 504, 506, 508 and 510 to pass the encoded multiplier string from output 212 of encoder 202 through bus 208 without reordering the bits of such encoded multiplier string. In particular, when the control signal is in the second state, $b_0$ passes to output Out 0, $b_1$ passes to output Out 1, $b_2$ passes to output Out 2, $b_3$ passes to output Out 3, and $b_4$ passes to output Out 4. Thus, in accordance with the foregoing description, the second state of the control signal in the present embodiment causes the multiplier 106 to generate the product B*C and causes the circuit 100 (FIG. 1) to perform the multiply/add calculation.

The first state of the control signal causes the multiplexors 502, 504, 506, 508 and 510 to pass the encoded multiplier string from output 212 through these multiplexors with reordered bits. When the control signal is in the first state, $b_0$ passes to output Out 0, $b_1$ passes to output Out 2, $b_2$ passes to output Out 1, $b_3$ passes to output Out 4, and $b_4$ passes to output Out 3. Thus, in accordance with the foregoing description, the first state of the control signal in the present embodiment causes the multiplier 106 to generate the multiplicative negate B*C and causes the circuit 100 (FIG. 1) to perform the multiply/subtract calculation. Alternate embodiments of the invention that generate the multiplicative negate −B*C, but that need not generate the product B*C, could eliminate the multiplexor 204 and simply couple the encoder 202 directly to the binary multiplier circuit 206 as shown in FIG. 7 using only a bus to achieve the appropriate reordering.

While the present embodiment has been described as using three bit multiplier strings, alternate embodiments can be designed for use with multiplier strings having any number of bits in accordance with bit pair recoding. FIG. 6 illustrates an encoding for four bit multiplier strings that could be used by alternate embodiments of the invention. As shown by columns 602 and 604 of FIG. 6, when four bit multiplier strings (column 602) are input into a bit-pair recoding encoder such as encoder 202, this encoder outputs nine bit encoded multiplier strings (column 604). These multiplier strings and encoded multiplier strings correspond to bit pair multipliers in column 606. Similar to the three bit multiplier string embodiment above, reordering of bits to provide reordered strings to a multiplier circuit such as circuit 206 could be used to accomplish negate multiplication in the manner described above. In this case, the reordering of the bits of the encoded string as was done in the previous embodiment to produce the negate multiplication can be seen from FIG. 6 to be $b_7b_8b_5b_6b_3b_4b_1b_2b_0$. Alternate embodiments of the invention can use whatever encoding and reordering is appropriate based upon the number of bits in the multiplier strings all as determined in accordance with bit pair recoding. Alternate embodiments could use types of encoding other than bit pair recoding. The disclosed reordering technique might also be used in software to perform a negate multiply operation.

While Applicant has described specific embodiments of the invention, the invention is not limited to or by the disclosed embodiments. The Applicant's invention may be applied beyond the particular systems mentioned as examples in this specification.

What is claimed is:

1. A multiplier circuit for obtaining a multiplicative negate product (−B*C) and a multiplicative product (B*C) of a multiplicand B and a multiplier C, wherein the multiplier C includes at least one multiplier string, the multiplier circuit comprising:

an encoder circuit having an input for receiving the multiplier C and having an output wherein the encoder circuit is adapted to identify the at least one multiplier string from the multiplier C and is adapted to provide on the encoder circuit's output an encoded multiplier string that corresponds to the at least one multiplier string;

a multiplexor circuit coupled to the output of the encoder circuit, the multiplexor circuit being configured to pass the encoded multiplier string or a reordered string to an output of the multiplexor circuit in response to a control signal, wherein the multiplexor circuit creates the reordered string by reordering bits of the encoded multiplier string; and a binary multiplier circuit having an input coupled to receive the multiplicand B and an input coupled to receive the encoded multiplier string or the reordered string provided on the output of the multiplexor circuit, wherein the binary multiplier generates the multiplicative negate product (−B*C) in response to the reordered string and the multiplicand B, and generates the multiplicative product (B*C) in response to the encoded multiplier string and the multiplicand B.

2. The multiplier circuit of claim 1 wherein:

the encoder circuit comprises a bit-pair recoding encoder circuit and the encoded multiplier string has been encoded using a bit-pair recoding algorithm.

3. The multiplier circuit of claim 1, further comprising a first bus coupled between the output of the encoder circuit and the multiplexor circuit, wherein the first bus transmits the encoded multiplier string to the multiplexor circuit.

4. The multiplier circuit of claim 3, further comprising a second bus coupled between the output of the encoder circuit and the multiplexor circuit, wherein the second bus reorders bits of the encoded multiplier string to create the reordered string, and wherein the second bus transmits the reordered string to the multiplexor circuit.

5. The multiplier circuit of claim 4, wherein the first and second buses share a common bus section that is connected to the output of the encoder circuit.

6. The multiplier circuit of claim 5, wherein the multiplexor circuit comprises a plurality of multiplexors, the first bus comprises a plurality of first bus lines and the second bus comprises a plurality of second bus lines, wherein at least one first bus line and at least one second bus line are coupled to each of the plurality of multiplexors, and wherein each of the plurality of multiplexors is adapted to pass bits of the encoded multiplier string between the encoder circuit and the binary multiplier circuit.

7. The multiplier circuit of claim 1, wherein the multiplexor circuit is configured to reorder bits of the encoded multiplier string such that a first bit is exchanged with a second bit.

8. The multiplier circuit of claim 7, wherein the multiplexor circuit is configured to reorder bits of the encoded multiplier string such that a third bit is exchanged with a fourth bit.

9. The multiplier circuit of claim 1, wherein the multiplexor circuit is configured such that the reordered string is produced from the encoded multiplier string without reordering at least one bit of the encoded multiplier string.

10. The multiplier circuit of claim 1, wherein the multiplexor circuit is configured to receive only encoded multiplier strings output by the encoder circuit.

11. The multiplier circuit of claim 1, wherein the encoder circuit comprises a bit-pair Booth encoder circuit and the encoded multiplier string has been encoded using a Booth algorithm.

12. The multipliers circuit of claim 1 wherein the encoded multiplier string comprises five bits.

13. The multiplier circuit of claim 12, wherein the multiplier comprises 8 bits.

14. A method of multiplying a multiplicand B and a multiplier C, the method comprising the steps of:

generating an encoded multiplier string having a first order in response to the multiplier C;

routing the encoded multiplier string to a first input of a multiplexor in the first order;

routing the encoded multiplier string to a second input of the multiplexor in a second order, different than the first order;

passing the encoded multiplier string through the multiplexor in the first order or the second order in response to a control signal; and generating a product of the multiplicand and the encoded multiplier string passed by the multiplexor, wherein the product represents a multiplicative product (B*C) when the multiplexor passes the encoded multiplier string in the first order, and wherein the product represents the multiplicative negate product (−B*C) when the multiplexor passes the encoded multiplier string in the second order.

15. A multiplier circuit comprising:

an encoder circuit configured to receive a multiplier C, the encoder circuit generating an encoded multiplier string having a first order in response to the multiplier C;

a bus coupled to receive the encoded multiplier string from the encoder circuit;

a multiplexor circuit having a first input coupled to receive the encoded multiplier string from the bus in the first order, and a second input coupled to receive the encoded multiplier string from the bus in a second order, different than the first order, the multiplexor circuit being configured to pass the encoded multiplier string in the first order or the second order in response to a control signal; and a binary multiplier circuit configured to receive a multiplicand B and the encoded multiplier string passed by the multiplexor circuit, the binary multiplier being configured to generate a product in response to the multiplicand B and the encoded multiplier string passed by the multiplexor circuit.

16. A circuit for performing a multiply/add calculation and a multiply/subtract calculation, the circuit comprising:

an encoder circuit configured to receive a multiplier C, the encoder circuit generating an encoded multiplier string having a first order in response to the multiplier C;

a bus coupled to receive the encoded multiplier string from the encoder circuit;

a multiplexor circuit having a first input coupled to receive the encoded multiplier string from the bus in the first order, and a second input coupled to receive the encoded multiplier string from the bus in a second order, different than the first order, the multiplexor circuit being configured to pass the encoded multiplier string in the first order or the second order in response to a control signal;

a binary multiplier circuit configured to receive a multiplicand B and the encoded multiplier string passed by the multiplexor circuit, the binary multiplier being configured to generate a product in response to the multiplicand B and the encoded multiplier string passed by the multiplexor circuit; and an adder circuit coupled to receive a number A and the product generated by the binary multiplier circuit, the adder circuit being configured to generate the sum of the number A and the product generated by the binary multiplier circuit.

* * * * *